United States Patent [19]

Göb

[11] Patent Number: 4,760,905

[45] Date of Patent: Aug. 2, 1988

[54] FLUID FRICTION CLUTCH

[75] Inventor: Werner Göb, Kürnach, Fed. Rep. of Germany

[73] Assignee: Fichtel & Sachs AG, Schweinfurt, Fed. Rep. of Germany

[21] Appl. No.: 43,200

[22] Filed: Apr. 24, 1987

[30] Foreign Application Priority Data

Apr. 26, 1986 [DE] Fed. Rep. of Germany ....... 3614297

[51] Int. Cl.⁴ .................... F16D 35/00; F16D 43/25
[52] U.S. Cl. .................... 192/58 B; 192/82 T
[58] Field of Search ............... 192/82 T, 58 B

[56] References Cited

U.S. PATENT DOCUMENTS

| 4,090,596 | 5/1978 | Blair | 192/58 B |
| 4,269,295 | 5/1981 | Kish | 192/58 B |
| 4,282,960 | 8/1981 | Glasson et al. | 192/82 T X |
| 4,381,051 | 4/1983 | Kikuchi | 192/82 T |
| 4,505,367 | 3/1985 | Martin | 192/82 T X |
| 4,690,103 | 9/1987 | Gob et al. | 192/82 T X |

FOREIGN PATENT DOCUMENTS

| 0134548 | 3/1985 | European Pat. Off. . |
| 3246783 | 6/1984 | Fed. Rep. of Germany . |
| 3442103 | 4/1986 | Fed. Rep. of Germany .... 192/82 T |
| 979629 | 1/1965 | United Kingdom . |
| 1080722 | 8/1967 | United Kingdom . |

Primary Examiner—Rodney H. Bonck
Attorney, Agent, or Firm—Toren, McGeady & Associates

[57] ABSTRACT

The fluid friction clutch for the cooling fan of an internal combustion engine carries, on the front of its housing, a bimetallic element on the longitudinal ends of which flexible retaining tabs are formed. The retaining tabs are bent over towards the front and riveted with the front. The securing of the bimetallic element is especially durable.

12 Claims, 3 Drawing Sheets

FLUID FRICTION CLUTCH

BACKGROUND OF THE INVENTION

The invention relates to a fluid friction clutch for a cooling fan of an internal combustion engine.

From Fed. German Patent Application No. 3,246,783 a fluid friction clutch for a cooling fan of an internal combustion engine is known in which a substantially U-shaped holder for a bimetallic element is fitted on the front of a housing enclosing the driven rotor so as to form shear gaps. The bimetallic element is a component of a regulating device which controls the shear fluid level in the working gap in dependence upon temperature. In the known fluid friction clutch the bimetallic element has a substantially rectangular configuration and is inserted in the region of its short sides into openings of the holder. It is resiliently held in the openings by the relatively slight initial stress force of a valve element arranged in the interior of the housing, which valve element is in connection with the bimetallic element through a thrust piece displaceably passing through the front of the housing. The manner of fastening has the advantage that the bimetallic element can easily be fitted and also replaced. However it has the disadvantage that in the case of heavy vibrations of the internal combustion engine the zones with which the bimetallic element is seated in the retaining fitting are knocked out, so that the bimetallic element can slip out of the retaining fitting due to unintended contact and the cooling fan loses its temperature-regulating properties.

The main concern of the invention is to avoid the above disadvantages and in a manner of simple design to secure the bimetallic element to the front of the housing, namely in such a way that it can be subjected without problem to even heavy vibrations.

SUMMARY OF THE INVENTION

Within the scope of the invention, flexible retaining tabs are integrally formed on the longitudinal ends of the bimetallic element, which tabs are angled off towards the front and are firmly fastened, preferably riveted, to the front. The retaining tabs are integral components of the bimetallic element and compensate for its variation of length, even though slight, in its temperature-caused flexure. The non-losable fastening is not disengaged even by heavier vibrations caused by the internal combustion engine.

In order to increase the flexibility of the retaining tabs, the cross-sectional area of the retaining tabs is expediently smaller than the cross-sectional area of the actual bimetallic element. For preference each of the retaining tabs consists of two flexible retaining bridge pieces arranged with spacing from one another which, by pairs in each case, connect the longitudinal end of the bimetallic element with a flange tab which contains the hole provided for the rivet connection. The interval between the two retaining bridge pieces at the same time forms a passage opening for the riveting tool needed for closing the rivet connection.

It has also proved to be favourable if the apertures formed between the retaining bridge pieces continue in the form of slots towards the centre of the bimetallic element. The slots reduce the tendency of the bimetallic element to curve not only in longitudinal direction but also in the transverse direction.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

Examples of embodiment of the invention will be explained in greater detail below by reference to drawings wherein.

DETAILED DESCRIPTION OF PREFERRED EMBODIMENTS OF THE INVENTION

Figure 1:
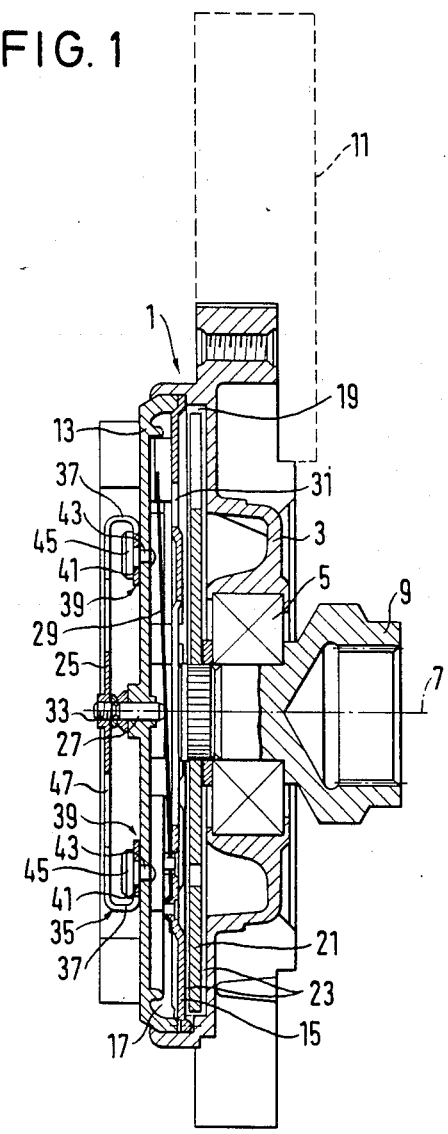
FIG. 1 shows an axial longitudinal section through a fluid friction clutch for a cooling fan of an internal combustion engine.
Figure 2:
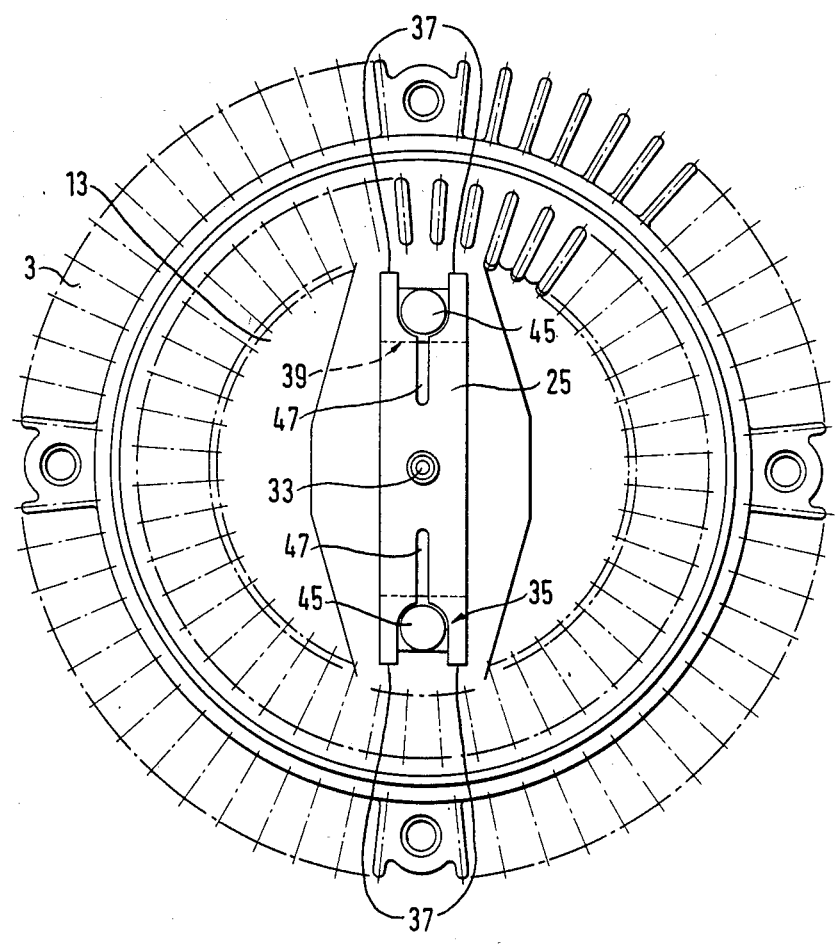
FIG. 2 shows a partial view of the fluid friction clutch seen in the direction towards the front and FIG. 3 shows an axial longitudinal section through a variant of the fluid friction clutch according to FIG. 1.

The fluid friction clutch as represented in FIGS. 1 and 2 comprises a housing designated generally by 1, which is rotatably mounted with a housing basic part 3, by means of a bearing 5, on a shaft 9 driven by the internal combustion engine about an axis 7 of rotation. The housing basic part 3 carries fan blades indicated at 11 and is closed in sealed manner by a cover 13 forming the front of the housing 1. A partition 15 divides the interior of the housing 1 into a reservoir chamber 17 for shear fluid and a working chamber 19 lying axially therebeside. In the working chamber 19 there is situated a rotor 21 of substantially disc form which, together with the housing basic part 3 and the partition 15, forms shear gaps 23 which, when they are filled with shear fluid, transmit the drive torque of the shaft 9 to the housing 1. When the shear fluid is conducted away out of the shear gaps 23 the clutch is disengaged.

The operation of the clutch is controlled by a bimetallic element 25 in dependence upon the ambient temperature. The bimetallic element 25 is secured in the manner as explained below on the outside of the cover 13 and acts through a central thrust piece 27, guided displaceably in the cover 13, upon a resilient valve lever 29 secured on the partition 15, which valve lever 29 in turn controls an opening 31 of the partition 15. Through the opening 31 shear fluid can pass from the reservoir chamber 17 into the working chamber 19 for the engagement of the clutch. A dynamo pressure pump device (not shown further), on relative rotation between the housing 1 and the rotor 21, ensures the return of the shear fluid from the working chamber 19 into the reservoir chamber 17 for the disconnection of the clutch. An adjusting screw 33 on the bimetallic element 25 permits the adjustment of the change-over behaviour of the clutch. The manner of operation of such fluid friction clutches is known and is therefore not to be explained in greater detail.

As shown best by FIG. 2, the bimetallic element 25 has a substantially rectangular elongated configuration on each of the longitudinal ends of which two retaining bridge pieces 37 are formed by apertures 35. The retaining bridge pieces 37 lie opposite to one another with spacing, in the transverse direction of the bimetallic element 25 and, as shown best by FIG. 1 for the longitudinal central plane of the bimetallic element 25, are angled in U-form and connected with one another at their ends by a common flange tab 39 in each case. The flange tab 39 and the retaining bridge pieces 37 are formed in one piece on the bimetallic element 25. The flange tabs 39 have holes 41 through which there pass rivets 45 seated in holes 43 of the cover 13, securing the bimetallic element 25 durably to the cover 13. The apertures 35 between the two retaining bridge pieces 37 at each of the two longitudinal ends extend, in a view of the cover 13, to over the rivets 45 and at the same time form passage openings for the riveting tools necessary for closing the rivets. Furthermore the apertures 35 reduce the cross-sectional area of the retaining bridge pieces in relation to the cross-sectional area in the middle region of the bimetallic element 25, so that the retaining bridge pieces 37 are sufficiently flexible to be able to compensate for the variation of length, even though slight, of the bimetallic element in the case of a temperature-caused flexure. The flexibility of the retaining bridge pieces 37 further has the function of a hinge.

The apertures 35 extend from the flange tabs 39, resting on the cover 13, to above the rivets 45. In the longitudinal central place of the bimetallic element 25 however the apertures 35 continue as slots 47 which are narrower in the transverse direction of the bimetallic element 25. The slots 47 terminate at a distance from the centre of the bimetallic element and the unslotted central region of the bimetallic element 25 amounts to more than about 30% of the overall length, represented in the axial view in FIG. 2, of the bimetallic element 25 including the projections of the retaining bridge pieces 37. The slots 47 improve the controlling properties of the bimetallic element 25, in that they reduce the transverse doming occurring transversely of the longitudinal direction of the bimetallic element 25.

Figure 3:
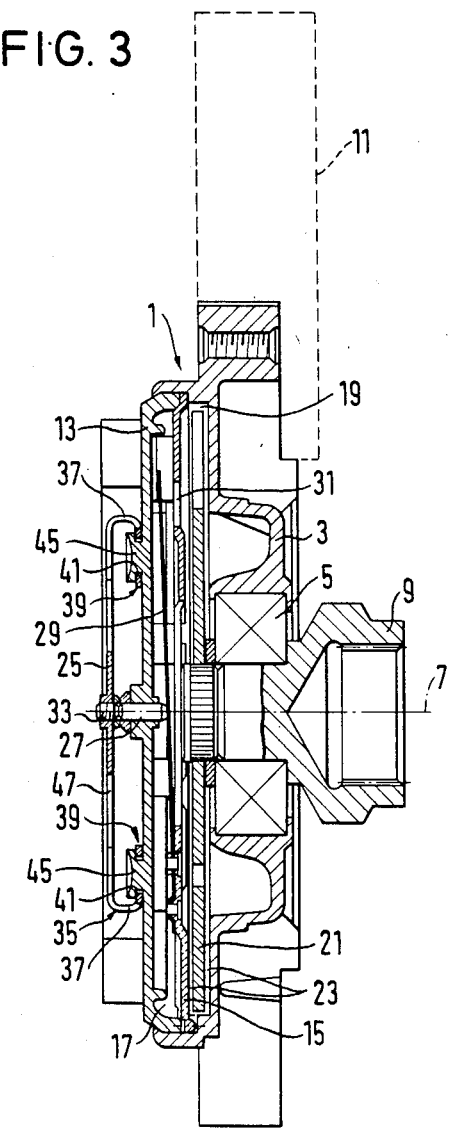

FIG. 3 shows a variant of a fluid friction clutch. Parts of like effect are designated in FIG. 3 by the reference numerals of FIGS. 1 and 2, and reference is made to the description of these figures for explanation.

The clutch according to FIG. 3 differs from the clutch according to FIGS. 1 and 2 merely in that the securing rivets 45 are not conducted through holes 43 of the cover 13, but are formed, for example by injection moulding, on the cover 13 as one-piece rivet projections. This design reduces the danger of leakages. The rivet projections 45 can be deformed by wobble devices or the like after the fitting-on of the bimetallic element 45.

The direct riveting of the bimetallic element 25 on the front of the cover 13 improves the strength of the fastening, in comparison with conventional types of fastening of bimetallic elements, so that durable fastening is achieved even in the case of heavily vibrating internal combustion engines. Unintended release of the bimetallic element, such as could occur hitherto, is prevented.

While specific embodiments of the invention have been shown and described in detail to illustrate the application of the inventive principles, it will be understood that the invention may be embodied otherwise without departing from such principles.

What I claim is:

1. A fluid friction clutch for a cooling fan of an internal combustion engine, comprising
   (a) a shaft,
   (b) a rotor connected fast with the shaft,
   (c) a housing for the reception of shear fluid, mounted rotatably on the shaft and enclosing the rotor, forming at least one shear gap, which housing has axially oppositely to the shaft a front extending substantially perpendicularly to the shaft axis,
   (d) a control device temperature-dependently controlling the filling level of the shear fluid in the shear gap, which device comprises a bimetallic element of substantially elongated strip form arranged externally on and spaced outwardly from the front of the housing and substantially parallel to the front, said bimetallic elements having a first end and a second end spaced apart in the elongated direction,
   (e) tab-like flexible retaining pieces integrally formed on the first and second ends of the bimetallic element, which said retaining pieces are bent inwardly towards the front of the housing, and retaining pieces each having an end spaced outwardly from the first and second ends with the retaining piece ends secured firmly on the front, the retaining pieces include flange tabs at the retaining piece ends located in the plane of the front and provided with a hole, and securing elements passing through the holes in the flange tabs hold the flange tabs on the front.

2. A fluid friction clutch according to claim 1, wherein the retaining pieces including the flange tabs thereon are bent substantially into a U-shaped form viewed in a plane extending in the elongated direction of said bemetallic element and perpendicular to the front, said retaining pieces spaced outwardly from the front form apertures lying opposite to the holes of the flange tabs, through which apertures the securing elements are accessible.

3. A fluid friction clutch according to claim 2, wherein the apertures extend in the elongated direction from said first and second ends to the flange tabs.

4. A fluid friction clutch according to claim 3, wherein the bimetallic element comprises slots extending in its longitudinal central plane which open into the apertures and are spaced from the middle of the bimetallic element between the first and second ends thereof.

5. A fluid friction clutch according to claim 4, wherein an unslotted region of the bimetallic element remains, in the elongated direction of the bimetallic element, between the slots, and has an extent of about 30% of the over-all length in the elongated direction.

6. A fluid friction clutch according to claim 1, wherein the retaining pieces between the first and second ends of the bimetallic element and the flange tabs, and transverse to the elongated direction of the bimetallic element have a cross-section area smaller than the corresponding cross-sectional area of the bimetallic element.

7. A fluid friction clutch according to claim 6, wherein at each of the first and second ends two said retaining pieces are arranged with spacing from one another in the direction transverse to the elongated direction of the bimetallic element, and the two retaining pieces connect the corresponding flange tab with the bimetallic element.

8. A fluid friction clutch according to claim 7, wherein the bimetallic element comprises slots extending in the elongated direction in its longitudinal central plane, which open between the two retaining bridge pieces and are spaced from the middle of the bimetallic element spaced between the first and second ends thereof.

9. A fluid friction clutch according to claim 8 wherein the slots are narrower than the distance between the two retaining bridge pieces.

10. A fluid friction clutch according to claim 8, wherein an unslotted region of the bimetallic element remains, in the elongated direction of the bimetallic element, between the slots, and has an extent of about 30% of the over-all length in the elongated direction.

11. A fluid friction clutch according to claim 1, wherein the securing elements are formed as rivets.

12. A fluid friction clutch according to claim 11, wherein the rivets are formed integrally on the front of the housing.

* * * * *